United States Patent [19]
Hochstein et al.

[11] Patent Number: 6,071,006
[45] Date of Patent: Jun. 6, 2000

[54] CONTAINER FOR DELIVERING A BEVERAGE TO BE MIXED

[76] Inventors: Peter A. Hochstein, 2966 River Valley Dr., Troy, Mich. 48098; Jeffrey Tenenbaum, 6162 Wynford, West Bloomfield, Mich. 48322; Paul G. Angott, 442 Five Gaits Ct., Bloomfield, Mich. 48304

[21] Appl. No.: 09/145,442

[22] Filed: Sep. 2, 1998

[51] Int. Cl.⁷ ........................................................ B01F 7/16
[52] U.S. Cl. .......................... 366/247; 366/242; 366/347; 366/244
[58] Field of Search ..................... 366/242, 244, 366/245, 247, 249, 252, 142, 144, 145, 146, 197, 199, 201, 139, 205, 206; 206/219, 222, 217; 241/101.1, 101.8; 220/592.16, 592.17, 592.18, 265, 284, 378, 380

[56] References Cited

U.S. PATENT DOCUMENTS

| | | | |
|---|---|---|---|
| 510,489 | 12/1893 | Rudell | 366/199 |
| 1,007,169 | 10/1911 | Woodruff | 366/246 |
| 1,428,438 | 9/1922 | Kelly | 366/246 |
| 2,485,303 | 10/1949 | Marcus | 366/247 |
| 2,760,763 | 8/1956 | Harper . | |
| 2,973,187 | 2/1961 | Wehmer | 366/139 |
| 3,084,052 | 4/1963 | McLaughlin . | |
| 3,172,441 | 3/1965 | Hartwig et al. | 366/205 |
| 3,432,027 | 3/1969 | Mueller . | |
| 3,446,636 | 5/1969 | Kraus . | |
| 3,544,341 | 12/1970 | Reimers . | |
| 3,612,126 | 10/1971 | Emmons | 366/205 |
| 3,704,864 | 12/1972 | Lee | 366/205 |
| 3,881,705 | 5/1975 | Greenspan | 366/205 |
| 4,184,422 | 1/1980 | Grise et al. . | |
| 4,408,690 | 10/1983 | Ferrero | 206/220 |
| 4,487,509 | 12/1984 | Boyce | 366/199 |
| 4,498,378 | 2/1985 | Norrie et al. | 366/139 |
| 4,561,782 | 12/1985 | Jacobsen et al. | 366/205 |
| 4,648,054 | 3/1987 | Tanaka et al. . | |
| 4,708,487 | 11/1987 | Marshall | 366/206 |
| 4,832,968 | 5/1989 | Forage et al. . | |
| 4,889,248 | 12/1989 | Bennett | 366/205 |
| 5,150,967 | 9/1992 | Neilson et al. | 366/206 |
| 5,431,276 | 7/1995 | Lialin . | |

Primary Examiner—Tony G Soohoo
Attorney, Agent, or Firm—Howard & Howard

[57] ABSTRACT

A cover 20 is hermetically sealed to the lip 18 of a container 12. A stirring shaft 26 extends between a bottom end 28 disposed in the container 12 and a top end 30 disposed outside of and above the cover 20. The container 12 includes a shaft support 32 for supporting and radially centering the bottom end 28 of the stirring shaft 26. A sanitary seal 34 hermetically seals the cover 20 about the stirring shaft 26. A plurality of mixing blades 38 extending radially from the shaft 26 in the container 12. The top end 30 of the shaft 26 includes a driving connection or coupling for receiving a rotating device for rotating the stirring shaft 26 and the mixing blades 38 for mixing the contents of the container 12. The bottom 14 of the container 12 includes an annular leg 40 for supporting the bottom 14 above the central portion 24 of a cover 20 and over the top end 30 of a stirring shaft 26 of a like container 12 assembly. To facilitate the stacking, the cover 20 includes a circular ridge 42 for receiving and centering the leg 40 of a like container 12 assembly. The container 12 with frozen contents is dispensed from a machine and engaged by a rotates device to rotate the blades 38 to mix the contents, such as a milkshake.

14 Claims, 2 Drawing Sheets

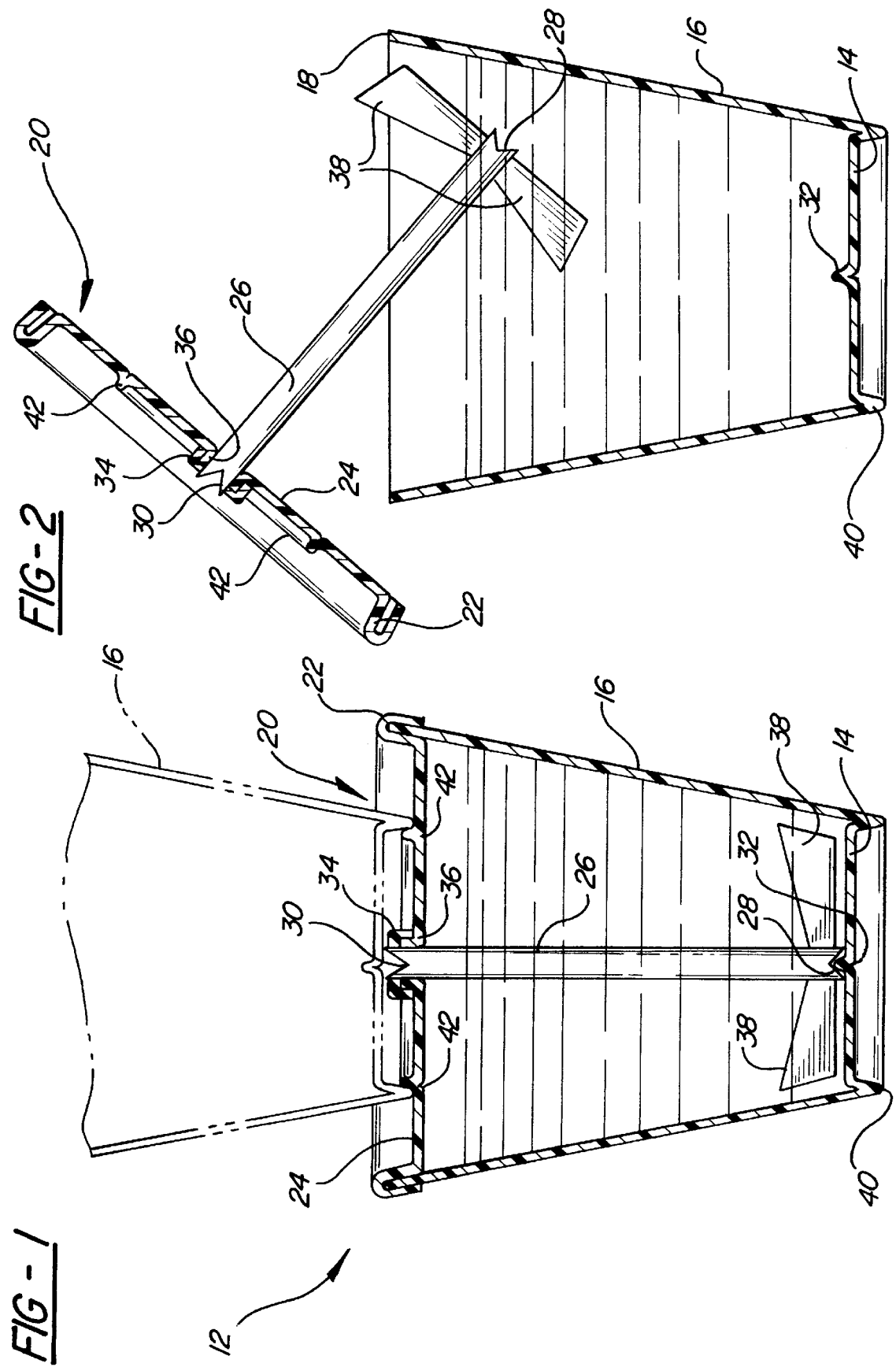

CONTAINER FOR DELIVERING A BEVERAGE TO BE MIXED

BACKGROUND OF THE INVENTION

1. Field of the Invention

The present invention relates to a beverage container such as a cup designed to be dispensed by an automated vending machine.

2. Description of the Prior Art

Certain food products or beverages such as milkshakes, iced or "slush" drinks and similar preparations require point of sale mixing. Such mixing or stirring is usually quite vigorous and is normally provided by intermittent high speed mixers as in the case of a milkshake machine. Alternatively, the mixing or stirring action is provided by a continuous, low speed machine such as provided by frozen drink or "slush" dispensers.

Because of the peculiar problems associated with these frozen beverages, they are commonly prepared at the point of sale on a demand basis. In other words, the beverage [as served] is not stored for any length of time prior to consumption. This inability to store frozen beverages prior to use is related to food chemistry and the desire for certain unique properties in the product.

Most of the foods that fall into the category of frozen beverages involve the dispersion of fine ice crystals within a matrix of other food products such as milk, cream, syrup, non dairy mixtures and the like. An important characteristic of these frozen beverages is that the dispersion of such fine ice crystals be homogenous throughout the matrix, and that the size of the ice crystals be relatively small and uniform. These parameters generally contribute to favorable "mouth feel" and are judged to be essential in order to elicit consumer acceptance.

While many foods have been successfully sold to consumers via self contained, free standing vending machines, frozen beverages such as milk shakes and other "slush" drinks have not. The primary reason for this exclusion has been the inability to properly mix the beverage after a long period of storage.

It is well known that if beverages that contain water in even small amounts are frozen for any length of time, ice crystals will form. The size of these crystals and their rate of formation is a function of many variables. Some of these factors are the storage temperature, mobility of the fluid phase, time at temperature, and the presence of freezing point depressants such as dissolved sugars, gums, etc., Common experience with ice-cream that is stored for extended periods suggests that even relatively small ice crystals that form in the ice cream are unpleasant. The problem with ice crystal growth in storage is exacerbated when the product contains a greater percentage of water, such as in sherbets or ices.

Milkshakes for example, which are normally made with ice-cream and milk (and other minor additions] cannot be served after storage in a freezer, without a vigorous remixing of the separated components. Storage of a prepared milkshake for even a few hours at temperatures below freezing, results In phase separation of the constituents with the resulting formation of large ice crystals. Storage at temperatures above the freezing point of water is not practical, because the ice-cream melts.

Milkshakes and other frozen beverages including yogurt and iced fruit drinks are not sold by unattended vending machines primarily because of the Ice formation problem. Equipping such machines with stirring or mixing mechanisms is not practical, because of the hygiene issues that are involved. That is, any device that would be inserted into the dispensing cup to adequately stir the contents would have to be scrupulously cleaned after every use, to insure a virtually sterile environment for the food product. The contamination risks involved with such on site cleaning are significant, and the liability exposure due to a malfunctioning cleaning or sterilizing cycle is probably unacceptable.

Individual, hygienic packaging of food products is a well developed art, and all types of food products are sold in vending machine. Unit packaging of ice-cream has been very successful, and when stored at sufficiently low temperature the product will keep for many weeks. Other products, in aseptic packaging, will keep for many weeks at temperatures just above the freezing point, which makes their storage far more cost efficient. Obviously, the cost of refrigeration is a direct function of the requisite storage temperature, and the ability to raise the safe storage temperature a few degrees has a direct impact on energy costs.

There are containers in the prior art such as that disclosed in U.S. Pat. No. 4,408,690 to Ferrero, but now are known which can accommodate such frozen products.

SUMMARY OF THE INVENTION AND ADVANTAGES

The subject invention provides a container assembly for beverages comprising a cup-shaped container having a bottom and a side wall extending upwardly from the bottom to a lip. A cover is hermetically sealed to the lip to hermetically seal the container. A stirring shaft extends between a bottom end disposed in the container and a top end disposed outside of the cover. A sanitary seal hermetically seals the cover about the stirring shaft and mixing blades extend radially from the shaft in the container. The top end of the shaft includes a driving connection for receiving a rotating device for rotating the stirring shaft and the mixing blades for mixing the contents of the container.

The present invention, therefore, involves the use of a prepackaged food product, such as a frozen beverage, that is contained in a novel container equipped with an integral stirring mechanism. This stirrer may be considered to be part of the container structure, and is never removed from the container after manufacture. The stirrer is mechanically engaged by external drive means to impart motion to the stirrer within the container. Such motion may be rotary, oscillatory, linear, or any combination thereof. No part of the drive mechanism, which is part of the dispensing machine ever comes in contact with the food product, thereby maintaining a hygienic food environment, and preventing contamination of the container contents.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross sectional view of a preferred embodiment;

FIG. 2 is a cross sectional view similar to FIG. 1 but showing the cover removed.

DETAILED DESCRIPTION OF THE PREFERRED EMBODIMENT

Figure 3:
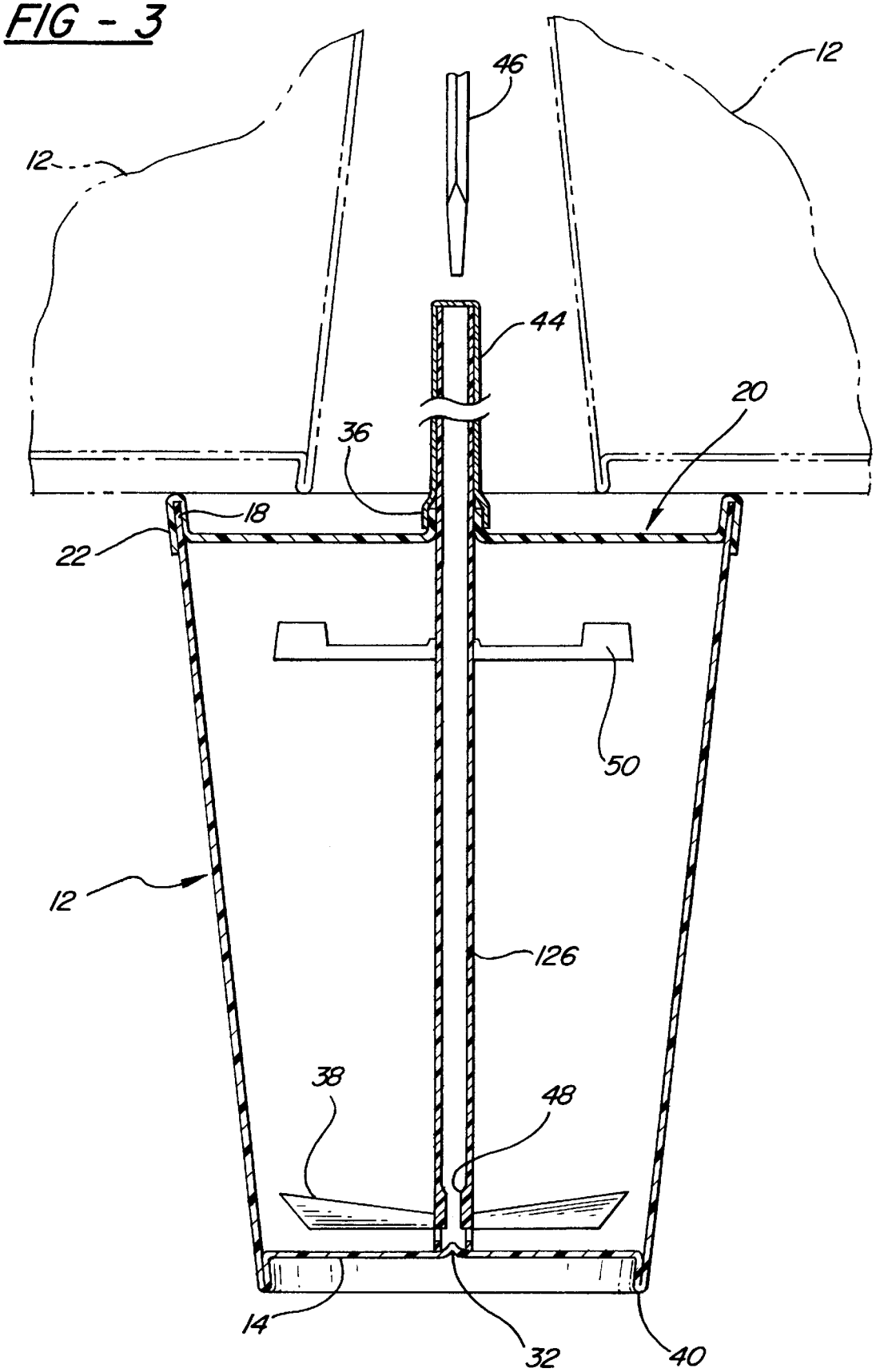
FIG. 3 is cross sectional view of an alternative embodiment.

Referring to the Figures, wherein like numerals indicate like or corresponding parts throughout the several views, a container assembly for beverages is shown in the Figures with a like container stacked in phantom in FIG. 1 and with the cover removed in FIG. 2.

More specifically, the assembly includes a cup-shaped container, generally shown at 12, having a bottom 14 and a side wall 16 extending upwardly from the bottom 14 to a lip 18.

A cover, generally indicated at 20, is hermetically sealed to the lip 18 to hermetically seal the container 12. This seal may be the same as those currently used for ice cream and food packages. The container 12 and the cover 20 may be made of paper product similar to current food packages. The cover 20 includes a U-shaped rim 22 engaging both the interior and exterior of the lip 18 of the container 12 and a central portion 24 recessed below the rim 22.

A stirring shaft 26 extends between a bottom end 28 disposed in the container 12 and a top end 30 disposed outside of and above the cover 20. The container 12 includes a shaft support 32 for supporting and radially restraining the bottom end 28 of the stirring shaft 26. The shaft support 32 supports and radially restrains or centers the bottom end 28 of the stirring shaft 26. The shaft support 32 consists of an integral apex extending upwardly into the container 12 from the bottom 14 and the bottom end 28 of the stirring shaft 26 defines a cone shaped recess engaging the apex.

A sanitary seal 34 hermetically seals the cover 20 about the stirring shaft 26. More specifically, the cover 20 includes an annular flange 36 disposed about the stirring shaft 26 and the sanitary seal 34 is disposed between the annular flange 36 and the stirring shaft 26. The sanitary seal 34 includes a skirt surrounding the exterior of the flange 36 and a cap with a hole therein tightly engaging the stirring shaft 26.

A plurality of mixing blades 38 extending radially from the shaft 26 in the container 12. The top end 30 of the shaft 26 includes a driving connection or coupling for receiving a rotating device for rotating the stirring shaft 26 and the mixing blades 38 for mixing the contents of the container 12. The coupling at the top end 30 of the shaft 26 may take a number of well known forms, female or male, like a hexagonal shape. The sanitary seal 34 is frangible in response to rotation of the stirring shaft 26, i.e., the septic seal 34, between the top of the container 12 and the stirring shaft 26, is fabricated of a thin, frangible material that is ruptured by the mixer stirring shaft 26 upon first actuation.

The bottom 14 of the container 12 includes at least one leg, in this case an annular leg 40, for supporting the bottom 14 above the central portion 24 of a cover 20 and over the top end 30 of a stirring shaft 26 of a like container 12 assembly. Accordingly, the top end 30 of the stirring shaft 26 extends out of the central portion 24 of the cover 20 no higher than the rim 22 so as to remain below the bottom of the stacked container 12. To facilitate the stacking, the cover 20 includes positioning means 42 for receiving and centering the leg 40 of a like container 12 assembly. The positioning means 42 comprises a circular ridge which tightly engages the interior of the annular or circular leg 40.

In accordance with the subject invention the container 12 is filled with liquid contents, such as a milkshake. This is followed by placing the stirring shaft 26 in the container 12 to center the bottom end 28 of the stirring shaft 26 on the bottom 14 of the container 12 and hermetically sealing the cover 20 to the container 12 with the stirring shaft 26 extending upwardly through and above the cover 20 while also hermetically sealing the stirring shaft 26 to the cover 20 as the shaft 26 extends through the cover 20. This is followed by freezing the liquid contents. The container 12 with the frozen milkshake is shipped to a dispensing machine as the containers 12 are stacked with the bottom 14 of the upper container 12 disposed above the upper end of the stirring shaft 26 of the lower container 12. The dispensing machine stores the containers 12 while cooling the frozen contents. The containers 12 are dispensed one at a time from the dispensing machine in response to a dispensing signal, e.g., a coin or bill of currency. Once the container is dispensed, a drive device on the dispensing machine is engaged with the stirring shaft 26 activated while the drive device remains outside the cover 20 to rotate the stirring shaft 26 to mix the liquid contents. Once mixed, the cover 20 may be removed from the container 12 and to remove the liquid contents. Alternatively, the cover may be pierced whereby a straw is inserted through the cover and into the container.

In practice, the container 12 of the invention would be filled with a fully mixed, frozen, pourable product, premeasured for the desired fill volume of the container 12. Space would be provided to allow for the added volume of the stirring mechanism 26, 38 and the displacement of the contents due to the mixing and/or stirring action. The necessary, vigorous mixing generally creates a substantial vortex which is forced up the sides of the container 12 towards the cover seal 18, 22, which must exhibit structural, fluid and hygienic sealing integrity under all conditions.

Alternatively, as shown in FIG. 3, the mixer stirring shaft 126 may configured as a hollow tube and be provided with a hygienic sheath 44 that would be removed by the consumer. The sheath 44 permits a motor drive shaft 46 of the vending machine to enter the stirring shaft 126 in order to engage the stirring shaft 126 at a drive connection 48 at the bottom which is closer to the mixer blades 38. Such an arrangement will reduce the torque on the drive tube, allowing for an inexpensive thin wall design. The hygienic sheath 44 is sealed to the annular flange 36 and may be pierced over the hollow stirring shaft 126 by the drive shaft 46 as it is inserted into the stirring shaft 126.

The stirring shaft 26 or 126 and attached blades 38 may be advantageously located in the container 12 by a locating shaft support 32 in the bottom of the container 12. Such a support 32 of the distal end of the stirring shaft 26 or 126 prevents flexure of the shaft 26 or 126, and may permit the use of a less substantial shaft 26 or 126, thereby reducing cost, while simultaneously reducing the waste mass. The stirring blades 38 are optimized for the particular product contained in the container 12, and may take the form of straight or canted paddles, propeller blades, a bent rod, or figured disc. Product viscosity, flow characteristics and mixing speed will determine the optimal configuration of the mixing tool that is contained in the container 12. As noted previously, alternate mixing geometries may incorporate push-pull movements, cyclic motions or any number of stirring enhancement means. One particularly useful improvement consists of an additional mixing vane 50 attached to the stirring shaft 26 above the blades 38. This added vane 50 has been found to improve mix homogeneity by forcing ice crystals that form on the top of the beverage back into the vortex formed by the lower mixer blades 38.

The cover of the container 12 may be sealed at the rim 22 to the upper lip 18 of the container 12 by any of the well known attachment means such as adhesives crimping, ultrasonic bonding, etc., as long as the seal is fluid tight, and can preserve the hygienic integrity of the product. The cover may be provided with a sealed access port to accept a manually or machine inserted straw. This sealed access port may also include a rupture disk which is punctured by the straw.

Experiments with various milkshake recipes indicate that the storage temperature has an important effect on the ability of the stirring device to optimally reconstitute the frozen, phase separated beverage. If the mixture is stored at typical freezer temperatures [10–15 degrees F.] the apparent mixture viscosity is very high and intimate remixing is more difficult.

Aseptic packaging should allow the product to be stored at an optimal mixing temperature [Circa. 25 degrees F.] while the storage life of the product would not be not compromised. As noted earlier, an increase of a few degrees in permissible storage temperature has significant energy saving implications.

Determining when the beverage has been properly mixed or reconstituted is not trivial, as the consistency and "mouth feel" of the drink is closely related to the viscosity and texture of the remixed product. A mixing cycle that is too aggressive will result in too thin a beverage, while insufficient mixing may leave objectionable ice crystals in the drink.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A container (12) assembly for beverages comprising;
    a cup-shaped container (12) having a bottom (14) and a side wall (16) extending upwardly from said bottom (14) to a lip (18),
    a cover (20) hermetically sealed to said lip (18) to hermetically seal said container (12),
    a stirring shaft (26, 126) extending between a bottom end (28) disposed in said container (12) and a top end (30) disposed outside of said cover (20),
    a sanitary seal (34, 44) hermetically sealing said cover (20) about said stirring shaft (26, 126),
    mixing blades (38) extending radially from said shaft (26, 126) in said container (12),
    said shaft (26, 126) including a driving connection for receiving a rotating device for rotating said stirring shaft (26, 126) and said mixing blades (38) for mixing the contents of said container (12),
    said cover (20) and said bottom (14) including at least one positioning device (42) for centering said bottom (14) of one of said containers (12) on the cover (20) of another of said containers (12).

2. An assembly as set forth in claim 1 wherein said bottom (14) of said container (12) includes a shaft support (32) for supporting and radially restraining said bottom end (28) of said stirring shaft (26, 126).

3. An assembly as set forth in claim 1 including a frozen beverage in said container (12).

4. An assembly as set forth in claim 1 wherein said stirring shaft (126) is a hollow tube.

5. A container (12) assembly for beverages comprising;
    a cup-shaped container (12) having a bottom (14) and a side wall (16) extending upwardly from said bottom (14) to a lip (18),
    a cover (20) hermetically sealed to said lip (18) to hermetically seal said container (12),
    a stirring shaft (26, 126) extending between a bottom end (28) disposed in said container (12) and a top end (30) disposed outside of said cover (20),
    a sanitary seal (34, 44) hermetically sealing said cover (20) about said stirring shaft (26, 126),
    mixing blades (38) extending radially from said shaft (26, 126) in said container (12),
    said shaft (26, 126) including a driving connection for receiving a rotating device for rotating said stirring shaft (26, 126) and said mixing blades (38) for mixing the contents of said container (12), and
    said sanitary seal (34, 44) being frangible in response to rotation of said stirring shaft (26, 126) by the rotating device.

6. An assembly as set forth in claim 5 wherein said cover (20) includes an annular flange (36) disposed about said stirring shaft (26, 126), said sanitary seal (34, 44) being disposed between said annular flange (36) and said stirring shaft (26, 126).

7. A container (12) assembly for beverages comprising;
    a cup-shaped container (12) having a bottom (14) and a side wall (16) extending upwardly from said bottom (14) to a lip (18),
    a cover (20) hermetically sealed to said lip (18) to hermetically seal said container (12),
    a stirring shaft (26, 126) extending between a bottom end (28) disposed in said container (12) and a top end (30) disposed outside of said cover (20),
    a sanitary seal (34, 44) hermetically sealing said cover (20) about said stirring shaft (26, 126),
    mixing blades (38) extending radially from said shaft (26, 126) in said container (12),
    said shaft (26, 126) including a driving connection for receiving a rotating device for rotating said stirring shaft (26, 126) and said mixing blades (38) for mixing the contents of said container (12),
    said cover (20) including a rim (22) engaging said lip (18) of said container (12) and a central portion (24) recessed below said rim (22), and
    said top end (30) of said stirring shaft (26, 126) extending out of said central portion (24) of said cover (20) no higher than said rim (22).

8. A container (12) assembly for beverages comprising;
    a cup-shaped container (12) having a bottom (14) and a side wall (16) extending upwardly from said bottom (14) to a lip (18),
    a cover (20) hermetically sealed to said lip (18) to hermetically seal said container (12),
    a stirring shaft (26, 126) extending between a bottom end (28) disposed in said container (12) and a top end (30) disposed outside of said cover (20),
    a sanitary seal (34, 44) hermetically sealing said cover (20) about said stirring shaft (26, 126),
    mixing blades (38) extending radially from said shaft (26, 126) in said container (12),
    said shaft (26, 126) including a driving connection for receiving a rotating device for rotating said stirring shaft (26, 126) and said mixing blades (38) for mixing the contents of said container (12),
    said cover (20) including a rim (22) engaging said lip (18) of said container (12) and a central portion (24) recessed below said rim (22), said top end (30) of said stirring shaft (26, 126) extending out of said central portion (24) of said cover (20) no higher than said rim (22), and said bottom (14) of said container (12) including at least one leg (40) for supporting said bottom (14) above said central portion (24) of a cover (20) and over the top end (30) of a stirring shaft (26, 126) of a like container (12) assembly.

9. An assembly as set forth in claim 8 wherein said cover (20) includes positioning means (42) for receiving and centering said leg (40) of a like container (12) assembly.

10. An assembly as set forth in claim 9 wherein said bottom (14) of said container (12) includes a shaft support (32) for supporting and radially restraining said bottom end (28) of said stirring shaft (26, 126).

11. An assembly as set forth in claim 10 wherein said shaft support (32) consists of an apex extending upwardly into said container (12) from said bottom (14) and said bottom end (28) of said stirring shaft (26, 126) defines a cone shaped recess engaging said apex.

12. A container (12) assembly for beverages comprising;

a cup-shaped container (12) having a bottom (14) and a side wall (16) extending upwardly from said bottom (14) to a lip (18), a cover (20) hermetically sealed to said lip (18) to hermetically seal said container (12), a stirring shaft (26, 126) extending between a bottom end (28) disposed in said container (12) and a top end (30) disposed outside of said cover (20), a sanitary seal (34, 44) hermetically sealing said cover (20) about said stirring shaft (26, 126), mixing blades (38) extending radially from said shaft (26, 126) in said container (12), said shaft (26, 126) including a driving connection for receiving a rotating device for rotating said stirring shaft (26, 126) and said mixing blades (38) for mixing the contents of said container (12), and said cover (20) including positioning means (42) for receiving and positioning the bottom (14) of a like container (12) assembly.

13. A container (12) assembly for beverages comprising;

a cup-shaped container (12) having a bottom (14) and a side wall (16) extending upwardly from said bottom (14) to a lip (18), a cover (20) hermetically sealed to said lip (18) to hermetically seal said container (12), a stirring shaft (26, 126) extending between a bottom end (28) disposed in said container (12) and a top end (30) disposed outside of said cover (20), a sanitary seal (34, 44) hermetically sealing said cover (20) about said stirring shaft (26, 126), mixing blades (38) extending radially from said shaft (26, 126) in said container (12), said shaft (26, 126) including a driving connection for receiving a rotating device for rotating said stirring shaft (26, 126) and said mixing blades (38) for mixing the contents of said container (12), and said drive connection (48) at the bottom of said stirring shaft (126).

14. A container (12) assembly for beverages comprising;

a cup-shaped container (12) having a bottom (14) and a side wall (16) extending upwardly from said bottom (14) to a lip (18), a cover (20) hermetically sealed to said lip (18) to hermetically seal said container (12), a stirring shaft (26, 126) extending between a bottom end (28) disposed in said container (12) and a top end (30) disposed outside of said cover (20), a sanitary seal (34, 44) hermetically sealing said cover (20) about said stirring shaft (26, 126), mixing blades (38) extending radially from said shaft (26, 126) in said container (12), said shaft (26, 126) including a driving connection for receiving a rotating device for rotating said stirring shaft (26, 126) and said mixing blades (38) for mixing the contents of said container (12), and said cover (20) including positioning device (42) for receiving and centering said bottom (14) of a like container (12) assembly.

\* \* \* \* \*